March 14, 1944.　　　　M. KRAUT　　　　2,344,094
JIG
Filed Feb. 19, 1940　　　　2 Sheets-Sheet 1

INVENTOR.
Max Kraut,
BY Russell M. Otis
ATTORNEY.

March 14, 1944.    M. KRAUT    2,344,094
JIG
Filed Feb. 19, 1940    2 Sheets-Sheet 2
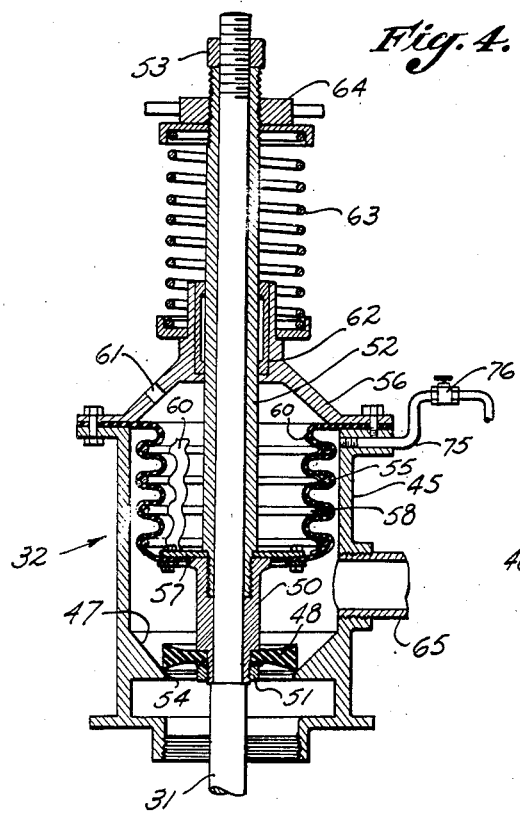
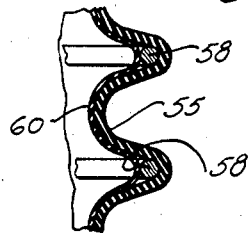
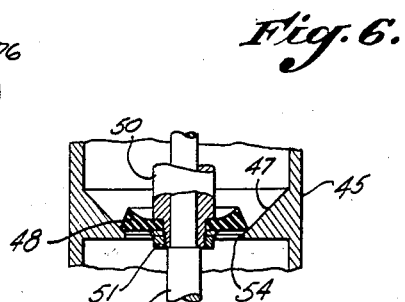
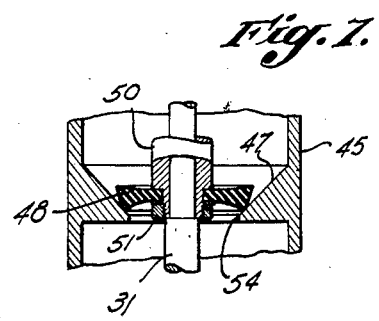
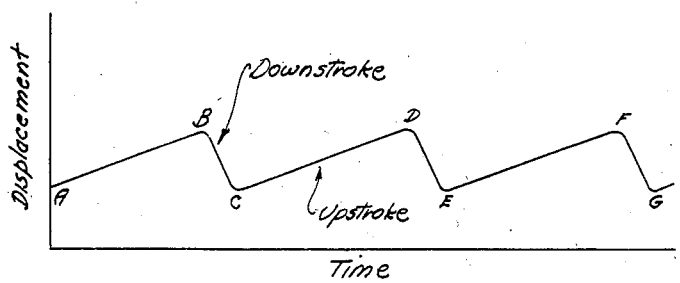
INVENTOR.
Max Kraut,
BY
Russell M. Otis
ATTORNEY.

Patented Mar. 14, 1944

2,344,094

UNITED STATES PATENT OFFICE 2,344,094

JIG

Max Kraut, San Francisco, Calif., assignor to Southwestern Engineering Company, Los Angeles, Calif., a corporation of California Application February 19, 1940, Serial No. 319,613

9 Claims. (Cl. 209—455)

This invention relates to apparatus used for the purpose of recovering free mineral or metallic particles from ores or gravel mixtures, and comprises certain improvements on the apparatus disclosed and claimed in my copending patent application, Serial No. 228,518. The apparatus of my invention is of that class known in the industry as a jig, and may be employed in the recovery of such material as native gold, tin oxide (cassiterite), tungsten in the form of scheelite or wolframite, heavy sulphides of the base metals such as galena and pyrite, and other such materials.

Briefly, a jig is an apparatus comprising a permeable bed, preferably composed of sand and other particles, supported by a screen, over which flows a mixture of water, gangue and the mineral desired to be recovered, there being means to provide an intermittent upward flow of water through the bed resulting in a classifying action therein by which the relatively heavy mineral desired to be recovered passes through the bed into a hutch below while the gangue passes over the bed and out of the apparatus.

Another object of the invention is to provide a jig with a flexible pan at the bottom of the hutch.

Another object is to provide a jig in which excessive packing of the permeable bed is avoided.

A further object is to provide a jig in which the upper surface of the pan at the bottom of the jig is flexible and is adapted on the downward stroke, when required, to lag behind its supporting structure in such manner as to relieve any tendency to create a vacuum in the hutch due to tight packing of the bed and continued downward movement of the pan, and in which means are provided for controlling this action by inlet of air to the under side of the flexible member.

Still another object of the invention is to provide an apparatus which is cheap to construct, requires a minimum of attention, and is of long life.

These and other apparent objects I attain in a manner which will be clear from consideration of the following description taken in connection with the accompanying drawings, of which:

Fig. 4 is a sectional view of the fluid motor for reciprocating the bottom of the jig, the controlling valve member being shown in the position in which it is undeflected.

Fig. 5 is an enlarged sectional view of the bellows forming a part of the fluid motor.

Fig. 6 is a partial sectional view of the fluid motor of Fig. 4 showing the controlling valve in its lowermost position.

Fig. 7 is a partial sectional view of the fluid motor of Fig. 4 showing the controlling valve in its uppermost position.

Fig. 8 is a diagram illustrating the manner of variation of displacement of the moving parts of the fluid motor and of the pan of the jig with time.

Figure 1:
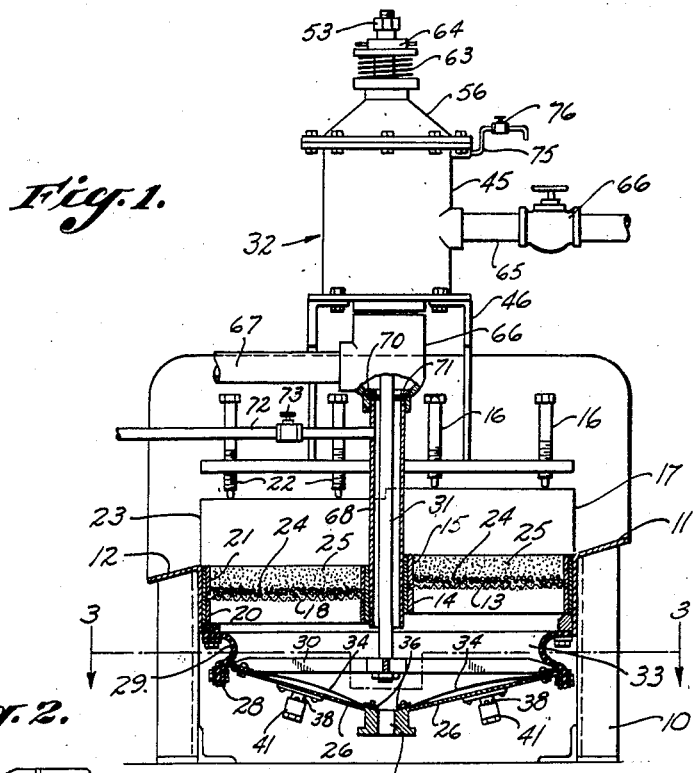
Fig. 1 is an elevational view of my apparatus, shown partly in cross-section.

In the embodiment of my invention chosen for illustration I provide a frame 10, preferably of generally rectangular shape in horizontal section, having a passage therethrough terminating at one side in an inlet trough 11 and at the other side in a discharge trough 12 which may be located at a somewhat lower elevation than the inlet trough 11 to facilitate flow through the jig. Adjacent the inlet trough 11, a horizontal screen 13 is supported between a lower grid 14 resting on the frame 10 and an upper grid 15 forced downward against the screen 13 by screws 16 acting upon blocks 17 in contact with the upper surface of grid 15 at the sides of the jig. Adjacent the discharge trough 12 is another screen 18 supported, preferably at a somewhat lower elevation than screen 13, between a lower grid 20 resting on frame 10 and an upper grid 21 which is forced downward against the screen 18 by screws 22 acting upon blocks 23 in contact with the upper surface of the grid 21 at the sides of the jig. The grids 14, 15, and 20, 21 preferably divide the horizontal area of the screens into a multiplicity of rectangularly shaped compartments. In the compartments formed by the grids above the screens is preferably placed a layer 24 of lead or steel shot about one inch thick and on top of this is built up a layer 25 of sand. The shot and sand layers 24 and 25 comprise a permeable bed of particles which is spoken of as the bed of the jig.

It is desirable to move water alternately upward and downward through the bed and to this end I provide below the grids 14 and 20 a vertically movable pan 26, preferably made of relatively thin resilient material such as thin sheet iron, and sloping gently from the periphery to the center where an outlet pipe 27 is connected and provides an outlet of relatively small capacity from the space above the pan. The pan 26 is preferably made in the shape of an inverted pyramid which at its base is of substantially the same size and shape as the bed of the jig. At its periphery the pan is, through the angular connecting members 28, attached to a section of bellows 29 of flexible material such as rubber, canvas, or the like, the upper end of which is secured to the frame 10. The flexible material 29 thus constitutes an expansible connection between the pan 26 and the screens above whereby is formed an enclosed space of variable volume between the pan and the bed. A spider 30 comprising a plurality of outwardly extending arms is attached to the connecting members 28 and to a vertically extending rod 31 which is adapted to be moved upwardly by action of the fluid motor 32 and to be moved downwardly again by the force of gravity acting on the water in the hutch 33, and on the pan 26 and associated parts.

Figure 2:
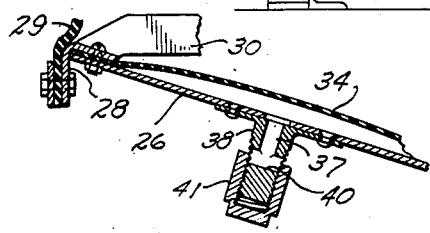
Fig. 2 is an enlarged partial view of the bottom of the jig.
Figure 3:
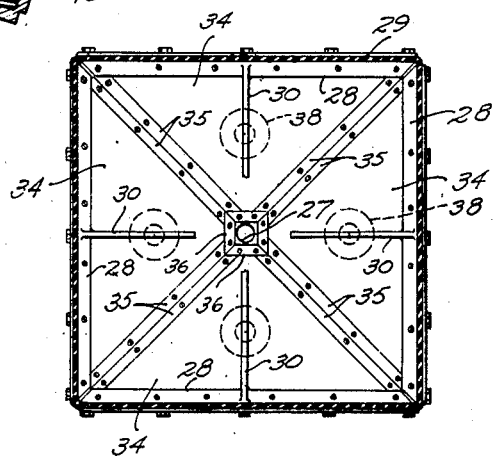
Fig. 3 is a sectional view of my apparatus taken along the line 3—3 of Fig. 1, as indicated.

For a purpose to be hereinafter described, on the upper side of each of the four flat pyramidal faces of the pan 26 I attach at the edges thereof an approximately triangular, expansible sheet 34 of flexible, and preferably resilient material, preferably rubber. Each sheet 34 is preferably secured at its outer edge with an air-tight connection between the pan 26 and a connecting angular member 28 and along the sides and adjacent the outlet 27 with air-tight connections between the pan 26 and clamping strips 35 and 36, respectively. The connection between each sheet 34 and the pan 26 is such that the space between is substantially air-tight except for an air passage 37 which may be formed as shown best in Fig. 2. A hole is made in the pan 26 under each of the sheets 34, over each of which holes an air control member 38 is located having a central passage 37 extending partly therethrough in alignment with the hole in the pan 26. Another hole 40 extends diametrically through the control member 38 and connects with the passage 37. A cap 41 is threaded tightly on the control member 38 and is adapted to be screwed down into a position wherein the passage 40 is completely open to the atmosphere and air is permitted freely to pass into the space between the flexible sheet 34 and the pan 26, or to be screwed up into a position wherein the cap 41 completely covers the hole 40 and prevents access of air to the space between the sheet 34 and the pan 26, or to be moved to any intermediate controlling position. Other means than that illustrated may be employed for controlling the air flow to and from the atmosphere and the space between the pan and the expansible sheets 34. While rubber or a similar resilient material is employed for the expansible sheet 34, a non-resilient, but flexible, material such as canvas may be employed instead, and when such a non-resilient material is used it is necessary to employ a sheet which is larger in area than the underlying pan to which it is attached, so that it can, if required, separate from the pan, as shown. A resilient sheet, such as one of rubber, may be installed flat and undeflected and can, when required, stretch into the position shown.

The actuating means 32 is adapted to be operated by pressure of fluid, preferably water, and to produce reciprocating motion of the rod 31. A housing 45 is secured to a bridge-like structure 46 spanning the jig from side to side and attached to the frame 10. The housing 45 is at its lower end preferably conical in shape and serves as a valve seat 47 for a resilient valve member 48, preferably of rubber, which is connected for movement with the rod 31. The valve member 48 may be clamped between a shoulder on the sleeve member 50 and a nut 51, and the sleeve member 50 may be held against a shoulder on the rod 31 by means of a sleeve member 52 on the rod 31 and a nut 53 threaded on the upper end of the rod 31.

The valve member 48 is preferably of tapered cross-section, being thin near the center support to provide flexibility and thickest at the peripheral edge to prevent the valve member from passing through the outlet 54 from the housing. I find that when I use a valve member 48 having a thick edge, as shown, it is possible to considerably increase the size of the outlet 54 over that which is possible when using a relatively thin-edged valve member such as that shown in my copending application above referred to, and still keep the valve member from passing through the outlet on the downward stroke. It will be evident why this is so from an inspection of Fig. 6 in which the valve member is shown in its lowermost position. It will be observed that in this position the lower peripheral edge of the valve member is forced even farther out radially than when the valve member is undeflected. Thus, a tendency of the valve member to pass through the outlet 54 on the downward stroke is averted.

A bellows 55 of flexible material, preferably rubber, and of diameter larger than the valve member 48, is housed within the housing 45, having its upper end clamped between the housing 45 and a cover 56 and its lower end attached to a plate 57 clamped between the sleeves 50 and 52. The bottom of the bellows thus constitutes a movable wall of the fluid chamber. Within each of the outwardly extending folds of the bellows 55, for lateral reinforcement of the bellows, I preferably place a metal ring 58, and all of the rings 58 are preferably held in place by means of a plurality of strips 60 of flexible material, preferably rubber which are vulcanized or otherwise secured to the inside surface of the bellows so as to cover over the rings 58 at locations circumferentially spaced around the bellows. A hole 61 is located in the cover 56 to permit air to freely move into and out of the space within the bellows 55.

The sleeve 52 is slideably guided in a bearing 62 in the cover 56, and a compression spring 63 surrounds the sleeve 52 and at one end abuts the cover 56 and at the other end abuts a nut 64 threaded on the sleeve 52. The spring 63 acts to balance part of the load due to the weight of the hutch water and parts supported by rod 31.

A water inlet pipe 65, provided with a control valve 66, discharges into the chamber within the housing 45 at a point between the valve member 48 and the bellows 55. To the outlet end of the housing 45 below the outlet 54 is connected a fitting 66 having a side discharge pipe 67 connected thereto and a pipe 68 connected to the bottom thereof and surrounding the rod 31. Space is left within the pipe 68 around the rod 31 for the passage of water. The pipe 68 passes downwardly through the bed of the jig and opens into the hutch. In the bottom of the fitting 66 is preferably located a washer 70, preferably of rubber, clamped between a shoulder of the fitting and a nut 71 in threaded engagement with the fitting. The washer 70 may pack the rod 31 in contact therewith to prevent passage of any fluid into the pipe 68 or it may be of any suitable internal diameter to permit passage of any desired proportion of the available water past the washer, through the pipe 68 and into the hutch. A water supply pipe 72, provided with a valve 73, is preferably connected to pipe 68 below the fitting 66 to supplement the supply of water to the hutch, if desired, or to alone supply the make-up water required if none is permitted to pass from the fitting 66 into the pipe 68.

It is found that water which is passed through the motor 32 generally contains air which is to some extent released within the housing 45 and accumulates in the uppermost portion of the space accessible to fluid between the bellows 55 and the housing 45, seriously hampering the action of the motor. It is found that a longer and more regular stroke is obtained if air is prevented from accumulating in this region by providing a pipe 75 in communication with the interior of the housing 45 adjacent the uppermost portion of the fluid chamber between the bellows 55 and the housing 45, the pipe 75 extending upwardly beyond the highest point of the fluid chamber and preferably including a control valve 76 located at the highest elevation of the pipe 75. The valve 76 may then be set so as to continuously pass a small stream of water which effectively sweeps air out of the fluid chamber of the motor and prevents its accumulation therein.

In the operation of the fluid motor 32 to reciprocate the rod 31, a fluid, preferably water, under pressure enters through the pipe 65 and acts upon both the valve member 48 and the movable wall comprising the plate 57 and the under side of the bellows 55, the force on the latter being greater than that on the valve member 48 by reason of the greater area acted upon. The rod 31 is, therefore, moved upwardly. Since the valve member 48 is flexible the periphery thereof continues to be held down against its seat by water pressure while the rod 31 moves upwardly. The rod 31 continues to move upwardly until the valve member 48 is deflected to such an extent that the water pressure on it can no longer hold its periphery on the seat 47. The conditions existing at this moment may be as illustrated in Fig. 7. Following a slight additional upward movement of the rod 31, the periphery of the valve member 48 will snap upwardly by reason of its resilience and open a passage to the outlet 54. Water then immediately rushes out of the outlet 54 and there is an instantaneous drop of the pressure beneath the bellows 55. The heavy weight of the water in the hutch 33 acting on the pan 26, together with the weight of the pan, the rod 31 and all associated parts causes the rod 31 to drop rapidly. When it has fallen to a point where the valve member 48 contacts the seat 47, pressure starts to build up again in the fluid chamber, but because of the momentum of the moving parts, they fall to a point where the conditions may be as illustrated in Fig. 6. At this point fluid pressure has overcome the downward movement and starts to move the bellows 55 and rod 31 upward, the motor again going through the cycle described above. The reciprocation of the rod 31 may be made slow or rapid as desired by control of the valve 66.

It is important to note that in the action of the motor 32, any substantial movement of the movable wall comprising the plate 57 and the bottom of the bellows results in a corresponding movement of the rod 31, and that the valve member 48 is sufficiently flexible that while the valve member is still closing the outlet the rod 31 is permitted to move through nearly its full stroke in the upward direction.

The water which is discharged from the motor passes into the fitting 66 and out through the pipe 67, a portion thereof, depending upon the opening between the washer 70 and the rod 31, passing down the pipe 68 to supply make-up water to the hutch.

In the operation of the jig as a whole, the feed, which may comprise gravel or sands in placer operations, or ball mill discharge in milling operations, which have been sluiced with water, is led over the inlet trough 11, onto the bed of sand and shot above the screens 13 and 18, and out over the discharge trough 12. The water fed with the material onto the bed of the jig passes through the screen, and this, together with part or all of the water which motivates the motor 32, fills all the space between the bed and the pan 26. The reciprocation of the rod 31 is communicated to the pan 26 and causes alternately rising and descending currents of water through the bed of the jig. These currents activating the bed have a classifying action on the material passing through the jig, only the particles of relatively great specific gravity being able to sink through the bed against the rising current. As a result of this action the relatively heavy particles gradually work down through the bed, through the screen and settle on the flexible sheets 34, while the lighter gangue particles pass over the bed and out over the discharge trough 12.

The type of reciprocation resulting from the cooperative action of the fluid motor 32 and the jig results in particularly efficient separation of particles and unusually high metallurgical recoveries. This type of reciprocation is diagrammatically illustrated in Fig. 8 and is characterized by relatively slow upward strokes AB, CD, EF, etc., during which the displacement varies substantially uniformly with time, and relatively rapid downward strokes BC, DE, FG, etc., during which the displacement also varies substantially uniformly with time. Thus, both the upward and downward velocities of the pan 26 and the water in the hutch 33 are approximately constant over approximately the entire stroke, while the downward velocity is much greater than the upward velocity. The importance and value of these velocity conditions is evident from the following analysis. In order to maintain the permeable bed of the jig in a state of suspension and to secure the greatest amount of work from the jig per unit of time it is desirable to move the water upwardly and downwardly through the bed with a relatively large number of alternations of movement per unit of time. But to permit high recovery of fine concentrate particles it is desirable to employ not too great an upward velocity of water. The most efficient condition, therefore, is one in which the downward velocity of water is considerably greater than the upward velocity of the water, for by this means the upward velocity may be limited to an efficient value and the number of strokes per unit of time may be maintained large. If, however, the downward velocity is too great at any time the bed tends to pack too severely, so it is clear that with a given maximum amount of water desired to be moved downwardly and a definite limit placed upon the maximum instantaneous downward velocity, the most efficient condition will be that in which the downward velocity is approximately constant over approximately the entire period of downward movement.

By this means a sufficiently rapid alternation of movement is secured to maintain the bed in an efficient condition and it is prevented from packing severely on the downward stroke. It will also be evident that the most efficient condition during the upward stroke is one in which the velocity is approximately constant over approximately the entire stroke because for any other condition during those periods when the velocity is higher than the most suitable velocity proper recovery of fine concentrate particles is being hampered, while during those periods when the velocity is less than the permissible value, time is simply being wasted and could better be employed in increasing the number of alternations per unit of time.

The jig of my invention is specially adapted to prevent disastrous effects of any packing of the bed which would otherwise occur if the downward velocity of water below the bed exceeds the permissible value for the material constituting the bed. In an ordinary jig, whenever this condition exists and the bed closes tightly, further downward movement of the pan must be accomplished against the vacuum which is created in the hutch by such continued movement. Since the area of the pan is generally large, the forces resisting further movement are great. As a result, in jigs driven by mechanical power, the motor often stalls or breaks under the severe load placed upon it, or the screen beneath the bed of the jig breaks or distorts, resulting in interruptions in service and the necessity for repair. One expedient sometimes resorted to is to permit additional water to enter the hutch to break the vacuum, but this is disadvantageous because on the upward stroke this additional water must be forced up through the bed, decreasing the metallurgical recovery and diluting the mixture above the bed, increasing the difficulty of further processing of this material. Without special provision in the jig, when a fluid motor such as that herein disclosed is employed, and tight packing of the bed occurs, the weight on the rod 31 may not be sufficient to pull the valve member 48 closed, or the water pressure may not be able to break open the tightly packed bed, and the jig simply stops. This undesirable condition is averted by virtue of the flexibility and expansibility of the sheets 34 on the pan 26 and their ability to separate from and lag behind the pan 26 on its downward stroke if there is any tendency to create a vacuum in the hutch.

On the downward stroke, if no undue packing of the bed occurs, the sheets 34 follow pretty closely the pan 26, but if the bed packs tightly and a vacuum tends to be created in the hutch by further movement of the pan, the sheets 34 separate from the pan 26 and permit the pan 26 to continue movement without appreciably changing the volume of the hutch above the sheets 34. In this manner, no additional force is required to be exerted on the pan 26 to continue its movement except that necessary to draw in air through the holes 40 and passages 37 to fill the spaces between the pan 26 and the sheets 34. Under these circumstances, it will be observed that no further packing of the bed takes place. When the pan starts upward, the air is first forced out from between the pan 26 and the sheets 34 and then the water is pushed upward through the bed. Normal operation, therefore, is made possible under the abnormal conditions existing. It is evident that by adjusting the cap 41 in different positions on the member 38 the air inlet to the space between the pan 26 and the sheets 34 may be varied to control the separation of the sheets 34 from the pan 26. The more nearly closed the hole 40 is, the closer the sheets 34 will stay to the pan 26. Controlling the separation of the sheets 34 from the pan 26 in this manner controls also the maximum force applied to, and the degree of packing of, the bed, enabling one to make the adjustment resulting in the greatest efficiency.

The concentrate which settles on the sheets 34 moves down to and out through the outlet 27 together with a continuous small stream of water. Water to make up for that which is lost in this manner may be supplied as discharge water from the motor 32 through the pipe 68 or may be supplied through the pipe 72.

One of the features of my apparatus is that very little vertical space is required from the discharge trough down to the floor. This valuable feature is in part achieved by employing the very shallow pan 26, which slopes only very gently toward the center where the outlet 27 is. With such a gentle slope it would ordinarily be difficult for the concentrate to move down to the outlet, but in my apparatus the pan 26 is preferably made of thin flexible material and is sufficiently flexible that application thereto of the forces sufficient for reciprocation thereof causes it to be periodically distorted in opposite directions to such an extent that concentrate particles are by reason of this distortion moved toward the outlet 27. In addition to this action, the breathing in and out of the sheets 34, as above described, disturb the concentrate particles settling on them and cause them to be moved toward the outlet 27. Thus the flexibility and expansibility of the sheets 34 serves two functions.

It will be understood that various changes and modifications in design and construction from the apparatus disclosed herein may be made by those skilled in the art without departing from the spirit and scope of the invention as defined in the appended claims.

I claim as my invention:

1. In a jig having a stationary screen and a permeable bed of particles supported by said screen, the combination of: a movable pan positioned below said screen and having an outlet opening at the bottom thereof; an imperforate expansible connection between said pan and said screen extending approximately around their perimeters, whereby is formed an enclosed space of variable volume between said pan and said screen; means for causing reciprocation of said pan in a vertical direction; and a substantially fluid-tight sheet secured across the upper face of said pan and adapted to expand into said enclosed space in response to a vacuum created in said space by downward movement of said pan, thereby allowing further downward movement of said pan without further increase in the effective volume of said space.

2. In a jig having a stationary screen and a permeable bed of particles supported by said screen, the combination of: a movable pan positioned below said screen and having an outlet opening at the bottom thereof; an imperforate expansible connection between said pan and said screen extending approximately around their perimeters whereby is formed an enclosed space of variable volume between said pan and said screen; means for causing reciprocation of said pan in a vertical direction; and an expansible substantially fluid-tight sheet overlying said pan structure and having access on its under side to the atmosphere.

3. In a jig having a stationary screen and a permeable bed of particles supported by said screen, the combination of: a movable pan positioned below said screen and having an outlet opening at the bottom thereof; an imperforate expansible connection between said pan and said screen extending approximately around their perimeters whereby is formed an enclosed space of variable volume between said pan and said screen; means for causing reciprocation of said pan in a vertical direction; an expansible substantially fluid-tight sheet overlying said pan and sealed thereto around its edge; and means for controlling access of air to the under side of said sheet.

4. In a jig having a stationary screen and a permeable bed of particles supported by said screen, the combination of: a movable pan positioned below said screen and having an outlet opening at the bottom thereof; an imperforate expansible connection between said pan and said screen extending approximately around their perimeters whereby is formed an enclosed space of variable volume between said pan and said screen; means for causing reciprocation of said pan in a vertical direction; a substantially fluid-tight sheet of resilient material secured to the upper side of said pan; and walls forming an air passage in communication with the under side of said sheet.

5. In a jig having a stationary screen and a permeable bed of particles supported by said screen, the combination of: a movable pan positioned below said screen and having an outlet opening at the bottom thereof; an imperforate expansible connection between said pan and said screen extending approximately around their perimeters whereby is formed an enclosed space of variable volume between said pan and said screen; means for causing reciprocation of said pan in a vertical direction; a substantially fluid-tight sheet of resilient material secured along its periphery to said pan; walls forming an air passage communicating with the space between said sheet and said pan; and means for controlling the flow of air through said passage.

6. In a jig having a stationary screen and a permeable bed of particles supported by said screen, the combination of: a movable inclined pan positioned below said screen and having a central outlet opening therein, said pan being in the shape of an inverted pyramid; an imperforate expansible connection between said pan and said screen extending approximately around their perimeters whereby is formed an enclosed space of variable volume between said pan and said screen; means for causing reciprocation of said pan in a vertical direction; an approximately triangular substantially fluid-tight sheet of rubber secured along its edges to the upper side of each of the pyramidal faces of said pan; and means associated with each of said pyramidal faces of said pan for connecting to the atmosphere the space between said pan and the overlying rubber sheet and for controlling the flow of air between said space and the atmosphere.

7. In a jig having a stationary screen and a permeable bed of particles supported by said screen, the combination of: a movable pan positioned below said screen and having an outlet at the bottom thereof; an imperforate expansible connection between said pan and said screen extending approximately around their perimeters whereby is formed an enclosed space of variable volume between said pan and said screen; means for causing reciprocation of said pan in a vertical direction; a substantially fluid tight sheet of flexible material secured around its periphery to the upper side of said pan; and means venting the under side of said sheet to the atmosphere.

8. In a jig having a stationary screen and a permeable bed of particles supported by said screen, the combination of: a movable inclined pan positioned below said screen and having a central outlet opening therein, said pan being in the shape of an inverted pyramid; an imperforate expansible connection between said pan and said screen extending approximately around their perimeters whereby is formed an enclosed space of variable volume between said pan and said screen; means for causing reciprocation of said pan in a vertical direction; an approximately triangular flexible substantially fluid-tight sheet secured along its edges to the upper side of each of the pyramidal faces of said pan; and means associated with said pan for connecting the lower faces of said sheets to atmosphere.

9. In a jig having a stationary screen and a permeable bed of particles supported by said screen, the combination of: a movable pan positioned below said screen and having an outlet at the bottom thereof; imperforate expansible means connecting said pan to said screen extending approximately around their perimeters whereby is formed an enclosed space of variable volume between said pan and said screen; means for reciprocating said pan vertically; and a substantially fluid tight sheet of flexible material lying on the upper face of said pan and movable with respect thereto upon decrease of pressure in said space above said sheet due to downward movement of said pan whereby said pan may continue its downward movement without further decrease in said pressure.

MAX KRAUT.